(12) United States Patent
Birenberg et al.

(10) Patent No.: US 11,054,943 B1
(45) Date of Patent: Jul. 6, 2021

(54) TOUCH RESTRICTION REGION FOR TOUCH-SENSITIVE DISPLAY

(71) Applicant: Microsoft Technology Licensing, LLC, Redmond, WA (US)

(72) Inventors: Dmitry Birenberg, Rosh Ha Ayin (IL); Gilad Pundak, Rehovot (IL); Idan Palmor, Ramat Gan (IL); Matan Slassi, Tel Aviv (IL); Nadav Linenberg, Even Yehuda (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/995,506

(22) Filed: Aug. 17, 2020

(51) Int. Cl.
*G06F 3/041* (2006.01)
*G06F 3/044* (2006.01)
*G06F 3/0354* (2013.01)

(52) U.S. Cl.
CPC ...... *G06F 3/04186* (2019.05); *G06F 3/03545* (2013.01); *G06F 3/044* (2013.01)

(58) Field of Classification Search
CPC ... G06F 3/04186; G06F 3/03545; G06F 3/044
See application file for complete search history.

(56) References Cited

U.S. PATENT DOCUMENTS

| | | | |
|---|---|---|---|
| 8,018,440 | B2 | 9/2011 | Townsend et al. |
| 8,294,686 | B2 | 10/2012 | Townsend et al. |
| 8,638,320 | B2 | 1/2014 | Harley et al. |
| 8,988,398 | B2 | 3/2015 | Cao et al. |
| 9,244,545 | B2 | 1/2016 | Hinckley et al. |
| 9,477,330 | B2 | 10/2016 | Stern |
| 9,785,272 | B1 | 10/2017 | Rosenberg et al. |
| 10,168,827 | B2 | 1/2019 | Hinckley et al. |
| 10,481,737 | B2 | 11/2019 | Christiansson et al. |
| 10,572,063 | B2 | 2/2020 | Case et al. |
| 2014/0152576 | A1 | 6/2014 | Kim et al. |

FOREIGN PATENT DOCUMENTS

WO 2011094044 A2 8/2011

OTHER PUBLICATIONS

"Illustrating the Force, Altitude, and Azimuth Properties of Touch Input", Retrieved from: https://web.archive.org/web/20190617194426/https://developer.apple.com/documentation/uikit/touches_presses_and_gestures/illustrating_the_force_altitude_and_azimuth_properties_of_touch_input, Jun. 17, 2019, 3 Pages.
Hinckley, et al., "Sensing Techniques for Tablet+Stylus Interaction", In Proceedings of the 27th Annual ACM Symposium on user Interface Software and Technology, Oct. 5, 2014, pp. 605-614.

*Primary Examiner* — Michael Pervan
(74) *Attorney, Agent, or Firm* — Alleman Hall Creasman & Tuttle LLP

(57) ABSTRACT

A touch-sensitive display device comprises a touch sensitive-display including display electrodes configured to detect proximity of input objects to the touch-sensitive display. A touch controller is configured to determine a two-dimensional position of a stylus touch input based on information from the plurality of display electrodes. An indication of a tilt angle and an azimuthal angle of the stylus is received. A touch restriction region is defined based at least on the two-dimensional position of the stylus touch input and the tilt and azimuthal angles of the stylus. Touch inputs within the touch restriction region are processed differently than touch inputs outside the touch restriction region.

20 Claims, 9 Drawing Sheets

200

```
┌─────────────────────────────────────────────────────────┐
│   DETERMINE A TWO-DIMENSIONAL POSITION OF A STYLUS TOUCH │
│          INPUT ON A TOUCH-SENSITIVE DISPLAY              │
│                                                      202 │
└─────────────────────────────────────────────────────────┘
                            ↓
┌─────────────────────────────────────────────────────────┐
│   RECEIVE AN INDICATION OF A TILT ANGLE AND AN AZIMUTHAL │
│                  ANGLE OF THE STYLUS                     │
│                                                      204 │
└─────────────────────────────────────────────────────────┘
                            ↓
┌─────────────────────────────────────────────────────────┐
│ DEFINE A TOUCH RESTRICTION REGION OF THE TOUCH-SENSITIVE │
│  DISPLAY BASED AT LEAST ON THE TWO-DIMENSIONAL POSITION  │
│   OF THE STYLUS TOUCH INPUT AND THE TILT AND AZIMUTHAL   │
│                  ANGLES OF THE STYLUS                    │
│                                                      206 │
└─────────────────────────────────────────────────────────┘
                            ↓
┌ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│   AFTER DETECTING A TOUCH INPUT THAT MEETS ONE OR MORE   │
│   TOUCH RESTRICTION CRITERIA AND HAS A POSITION OUTSIDE  │
│  THE TOUCH RESTRICTION REGION, CHANGE EITHER OR BOTH OF  │
│         THE FIRST AND SECOND BOUNDARY ANGLES             │
│                                                      208 │
└ ─ ─ ─ ─ ─ ─ ─ ─ ─ ─ ─ ─ ─ ─ ─ ─ ─ ─ ─ ─ ─ ─ ─ ─ ─ ─ ─ ─ ┘
                            ↓
┌─────────────────────────────────────────────────────────┐
│   PROCESS TOUCH INPUTS WITHIN THE TOUCH RESTRICTION      │
│  REGION DIFFERENTLY THAN TOUCH INPUTS OUTSIDE THE TOUCH  │
│                   RESTRICTION REGION                     │
│                                                      210 │
└─────────────────────────────────────────────────────────┘
```

TOUCH RESTRICTION REGION FOR TOUCH-SENSITIVE DISPLAY

BACKGROUND

Touch-sensitive display devices may detect touch input when a suitable input object contacts a surface of a touch-sensitive display. A touch input may be interpreted by the touch-sensitive display device as a user input at a particular two-dimensional position on the surface of the display.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A touch-sensitive display device comprises a touch sensitive-display including display electrodes configured to detect proximity of input objects to the touch-sensitive display. A touch controller is configured to determine a two-dimensional position of a stylus touch input based on information from the plurality of display electrodes. An indication of a tilt angle and an azimuthal angle of the stylus is received. A touch restriction region is defined based at least on the two-dimensional position of the stylus touch input and the tilt and azimuthal angles of the stylus. Touch inputs within the touch restriction region are processed differently than touch inputs outside the touch restriction region.

BRIEF DESCRIPTION OF THE DRAWINGS

FIG. 2 illustrates an example method for touch restriction.

DETAILED DESCRIPTION

A touch-sensitive display device may detect a touch input caused by proximity of a suitable input object to a surface of the display. As used herein, "touch input" refers to any input detected by a touch-sensitive display device caused by proximity or contact of an input object with the surface of the touch-sensitive display. Non-limiting examples of suitable input objects include human fingers, other portions of a human hand, styli (including active and passive styli), and suitable control devices (e.g., a dial control that affixes to the surface of the display).

Figure 1:
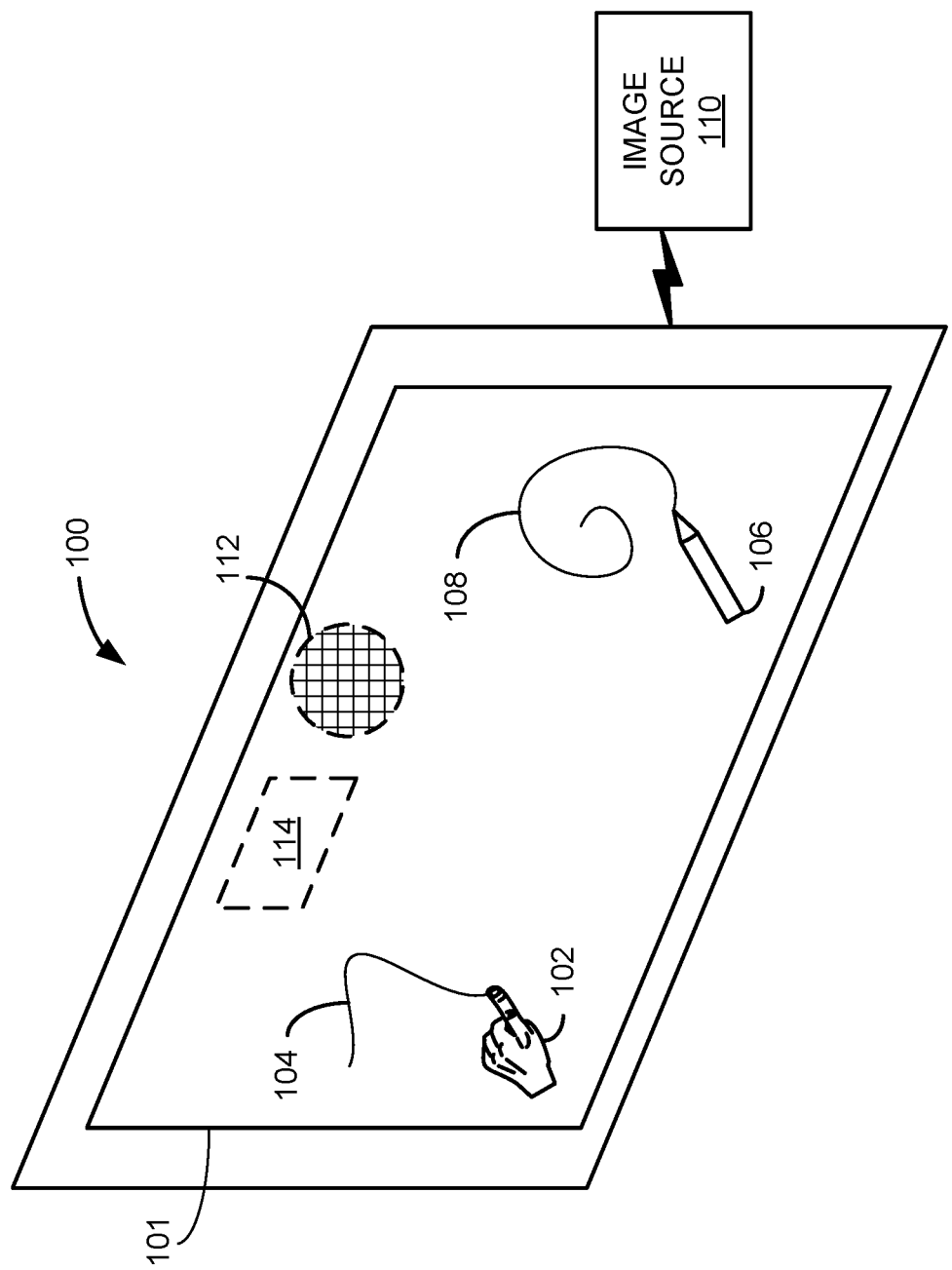
FIG. 1 schematically shows an example touch-sensitive display device.

This is schematically illustrated in FIG. 1, which shows an example touch-sensitive display device 100 including a touch-sensitive display 101. Both the touch-sensitive display 101 and touch-sensitive display device 100 may have any suitable size and dimensions. In some examples, a touch-sensitive display device may include more than one touch-sensitive display. For example, a "touch-sensitive display device" as described herein may refer to a device having two or more touch-sensitive displays in a foldable or static configuration, as well as single-display devices such as display device 100.

Furthermore, in some cases, a touch-sensitive display device may share a common housing with suitable computer hardware—e.g., such as in a laptop or tablet computer. In other examples, however, the touch-sensitive display device may be a standalone peripheral display (e.g., a monitor or television) configured to present content received from a separate device or source via a suitable wired or wireless connection. In any case, a touch-sensitive display device may have any suitable form factor and hardware configuration. A touch-sensitive display device may be implemented as computing system 900 described below with respect to FIG. 9.

In FIG. 1, a finger of a human hand 102 is contacting a surface of the touch-sensitive display 101, causing the touch-sensitive display device 100 to detect a touch input at the current two-dimensional position of the finger. The path of this touch input is represented by line 104 on the surface of the display, where the shape of the line reflects movement of the finger across the surface of the display prior to the depicted point in time. Similarly, a stylus 106 is also contacting the surface of display 101, causing the touch-sensitive display device to detect a touch input at the current two-dimensional position of the stylus. Once again, a line 108 is used to represent a prior movement of the stylus across the surface of the display.

Touch-sensitive display device 100 optionally may present image content on touch-sensitive display 100. Such image content may be received from an image source 110, which may take any suitable form. For example, the image source may include a computing device external to, or housed within, the display device 100. In FIG. 1, touch input detected by the touch-sensitive display device is graphically represented on the touch-sensitive display (i.e., as lines 104 and 108). It will be understood, however, that this need not be the case. Rather, touch input may be used to manipulate content presented on the touch-sensitive display, or otherwise control the touch-sensitive display device, without any representation of the touch input itself being rendered for display.

The touch-sensitive display may detect proximity of input objects in any suitable way, utilizing any suitable touch-sensing and/or hover-sensing technologies. For example, the touch-sensitive display device may use a suitable capacitive touch sensor—e.g., relying on mutual capacitance or self-capacitance—although non-capacitive technologies may alternatively be used. In FIG. 1, the touch-sensitive display includes a plurality of display electrodes 112 configured to detect proximity of input objects to the touch-sensitive display. For example, the display electrodes may detect a change in capacitance caused by proximity of an input object to the display surface. By monitoring electrical conditions at the plurality of display electrodes, a touch controller 114 may determine the two-dimensional position of the touch input relative to the surface of the display. The display electrodes and touch controller are shown with dashed lines to indicate that they are disposed beneath the display surface.

The touch controller may take the form of any suitable computer logic or processing componentry. In some examples, the touch controller may take the form of logic subsystem 902 described below with respect to FIG. 9.

The present disclosure describes touch input as being detected by the touch-sensitive display device in response to "proximity" of input objects to the surface of the touch-sensitive display. This may include situations in which the input objects directly contact the surface of the touch-sensitive display. In some cases, touch input may additionally be detected when the input objects hover in close proximity to the surface of the display—e.g., within a few centimeters—without directly contacting the display surface.

Regardless, the touch-sensitive display device may be configured to respond to touch inputs in a variety of suitable ways. In this manner, a user may control the touch-sensitive display device by intentionally brining input objects into proximity with the touch-sensitive display. Such inputs may be referred to herein as valid touch inputs. However, not all touch inputs detected by the touch-sensitive display device may correspond to intended user inputs. In a common scenario, a user may use a stylus to write on (or otherwise provide touch input to) the surface of the display while portions of the user's hand or palm also contact the display. In such a scenario, the hand/palm contacts could be detected and confused as touch inputs, which can interfere with the user's attempts to control the device. These and similar inputs may be referred to herein as invalid touch inputs.

The present disclosure therefore describes techniques for touch restriction for a touch-sensitive display device. Specifically, the present disclosure primarily focuses on a situation in which the touch-sensitive display device receives an intended touch input from a stylus, while also restricting unintended touch inputs corresponding to the hand of the user holding the stylus. Accordingly, a touch restriction region may be defined on the surface of the touch-sensitive display, at a position that is based at least on a two-dimensional position of a stylus touch input, as well as tilt and azimuthal angles of the stylus. Any touch inputs detected within the touch restriction region may be processed by the touch-sensitive display device differently from any touch inputs outside of the touch restriction region. For example, touch inputs within the touch restriction region may be ignored by the device, or reported to a software application or other touch input evaluator (e.g., computer operating system) along with an indication that the touch input may be invalid. In this manner, the touch-sensitive display device may more consistently respond to intended touch inputs, without disrupting the user experience by responding to unintended touch inputs in unintended manners.

FIG. 2 illustrates an example method 200 for touch restriction on a touch-sensitive display device. Method 200 may be implemented by any suitable touch-sensitive display device, having any suitable hardware configuration and form factor. Steps of method 200 may in some cases be performed by a touch controller, such as touch controller 114 described above with respect to FIG. 1. In some cases, method 200 may be implemented by computing system 900 described below with respect to FIG. 9.

At 202, method 200 includes determining a two-dimensional position of a stylus touch input on a touch-sensitive display, based on information from a plurality of display electrodes. The specific manner in which the two-dimensional position of the stylus touch input is determined will depend on the specific type of touch technology used in the touch-sensitive display device, and the techniques disclosed herein may be applied to any touch sensing technology. As discussed above, the touch-sensitive display device may include a plurality of display electrodes disposed beneath the surface of the touch-sensitive display. Proximity of an input object to the surface of the display may influence electrical conditions (e.g., capacitance) at one or more of the plurality of display electrodes, and this change in electrical conditions may be reported to the touch controller. By monitoring which display electrodes report changes in electrical conditions at which times, the touch controller may localize touch inputs to specific two-dimensional positions on the surface of the touch-sensitive display.

Figure 3B:
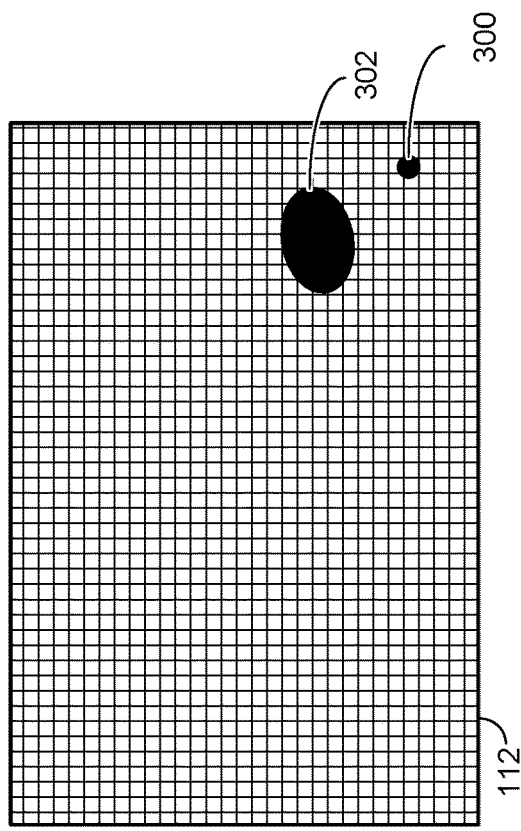
FIGS. 3A and 3B schematically illustrate detection of touch input at a touch-sensitive display.
Figure 3A:
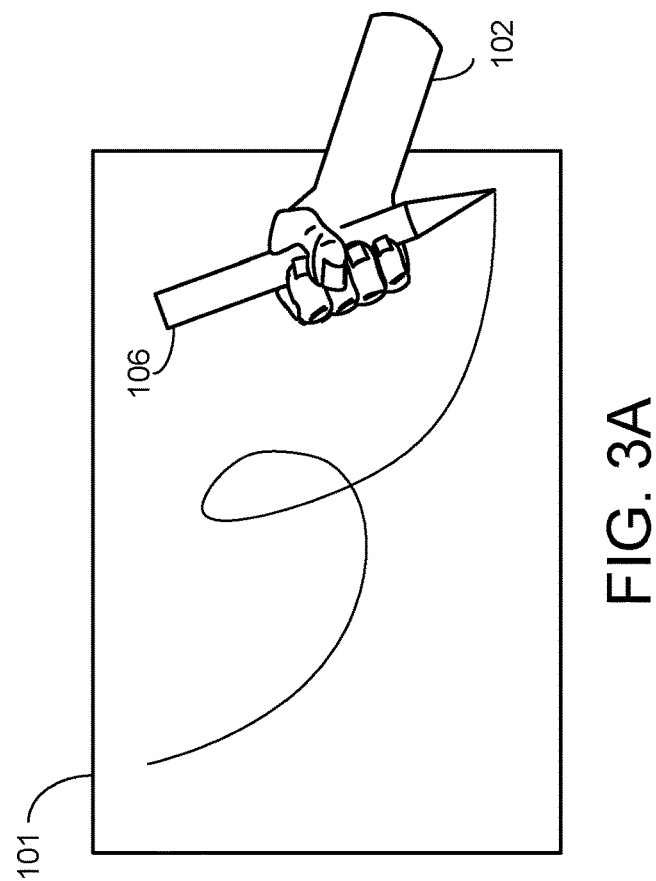

This is schematically illustrated with respect to FIGS. 3A and 3B. FIG. 3A again shows touch-sensitive display 101. Stylus 106, held by user hand 102, is providing a stylus touch input to the touch-sensitive display. At the same time, a portion of the user hand is also contacting the surface of the touch-sensitive display.

FIG. 3B schematically represents the plurality of display electrodes 112 disposed beneath the surface of touch-sensitive display 101. Black regions 300 and 302 shown within the plurality of display electrodes represent positions at which the touch-sensitive display device is currently detecting touch input. FIG. 3B is therefore analogous to a "heat map" showing the distribution of touch inputs across the touch-sensitive display at a given time. Specifically, region 300 corresponds to the stylus touch input provided by stylus 106 shown in FIG. 3A. Similarly, region 302 corresponds to the portion of user hand 102 contacting the surface of the touch-sensitive display in FIG. 3A.

Figure 4A:
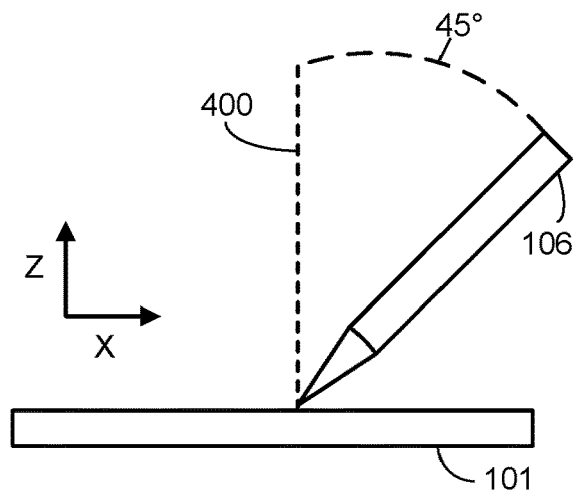
FIGS. 4A, 4B, and 4C schematically illustrate measurement of stylus tilt and azimuthal angles.

Returning to FIG. 2, at 204, method 200 includes receiving an indication of a tilt angle and an azimuthal angle of the stylus. This is schematically illustrated with respect to FIGS. 4A, 4B, and 4C. Specifically, the tilt angle of the stylus is shown in FIG. 4A. Stylus 106 is contacting touch-sensitive display 106 at approximately a 45° angle, relative to a reference line 400 having a 0° tilt angle (i.e., parallel to the Z axis depicted in FIG. 4A and perpendicular to the plane of the display). In general, the tilt angle is measured relative to the Z axis or another suitable frame of reference without respect to the stylus's azimuthal orientation in the XY plane.

Figure 4B:
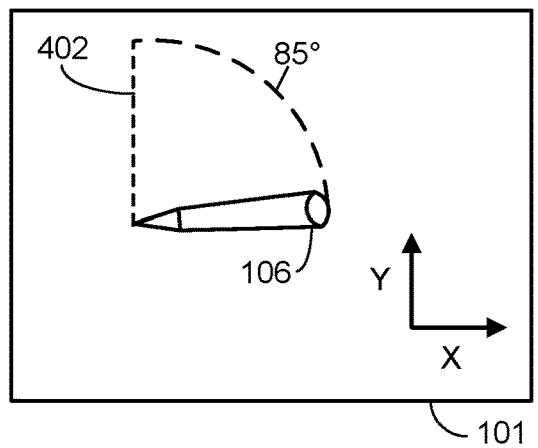

By contrast, FIG. 4B depicts the azimuthal angle of the stylus. As shown, the stylus is oriented at an approximately 85° angle relative to a second reference line 402, having a 0° azimuthal angle (i.e., a Y axis extending vertically toward a top edge of the touch-sensitive display). In general, the azimuthal angle is measured in the XY plane of the display surface without respect to the stylus's tilt relative to the Z axis.

Figure 4C:
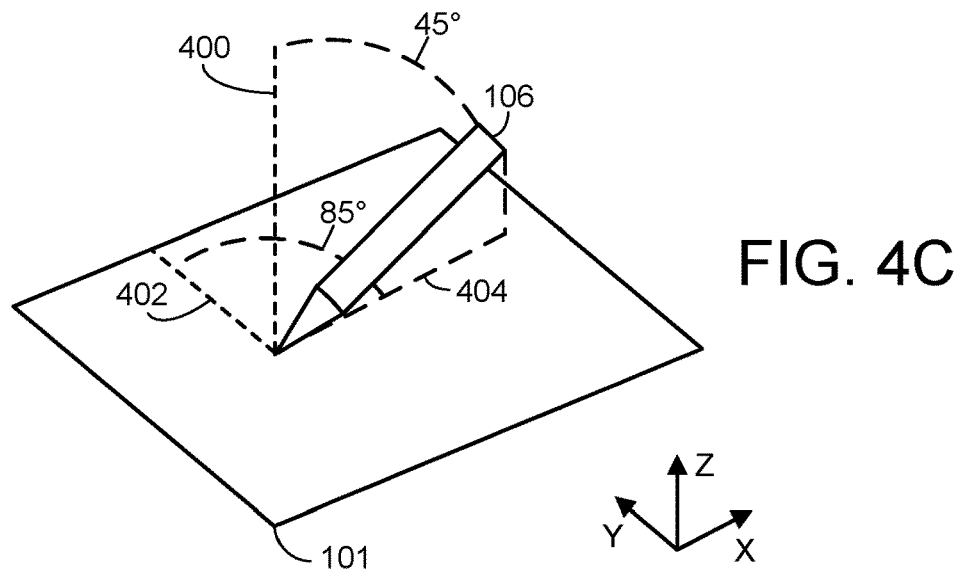

FIG. 4C shows another view of touch-sensitive display 101, illustrating the relationship between the tilt and azimuthal angles of the stylus. As shown, the stylus still has an approximately 45° angle relative to reference line 400. FIG. 4C also includes a projection 404 of the stylus onto the XY plane of the touch-sensitive display. The azimuthal angle of the stylus is given by the relationship between reference line 402 and projection 404—in this example, approximately 85°.

It will be understood that a stylus may provide input to a touch-sensitive display device while having any suitable tilt and azimuthal angles, and such angles may be defined relative to any suitable references. In other words, the reference lines depicted in FIGS. 4A, 4B, and 4C are non-limiting.

The touch controller may receive the indication of the tilt angle and the azimuthal angle of the stylus from any suitable source, and such angles may be calculated in any suitable way. In some examples, the indication of the tilt and azimuthal angles may be received from the touch-sensitive display device, and/or from a computing device within or external to the touch-sensitive display device. For example, the tilt and/or azimuthal angles of the stylus may be estimated based on the shape and/or size of a touch input "blob" detected by the touch-sensitive display. A stylus contacting the touch-sensitive display at approximately a 0° tilt angle will tend to form a relatively symmetrical touch input blob. By contrast, larger tilt angles will often form asymmetrical touch input blobs that are elongated in the direction of the azimuthal angle. Thus, by analyzing the shape of the touch input blob caused by proximity of the stylus to the surface of the display, the touch-sensitive display device may estimate the approximate tilt and azimuthal angles of the stylus. This may advantageously enable the touch-sensitive display device to determine the tilt and azimuthal angles of the stylus, and therefore implement the techniques described herein, without requiring additional hardware beyond what would ordinarily be found in a touch-sensitive display device or passive stylus.

As another example, the touch-sensitive display device may include one or more suitable cameras, or other imaging devices, configured to image the stylus as it provides input to the touch-sensitive display. Thus, the tilt and azimuthal angles of the stylus may be calculated based on analysis of images of the stylus captured by the touch-sensitive display device. This may in some cases provide more accuracy than the touch "blob" approach, while still enabling use of passive styli.

The above examples each pertain equally to passive styli, as well as active styli (i.e., styli that include internal circuitry). However, in cases where an active stylus is used, the indication of the tilt angle and the azimuthal angle may in some cases be received from the stylus itself. For example, the active stylus may be equipped with suitable angle sensors configured to calculate the tilt and/or azimuthal angles of the stylus as the stylus provides touch input to the touch-sensitive display device (e.g., inertial measuring unit (IMU) including accelerometer(s), gyroscope(s), magnetometer, and/or relative positional sensors configured to track orientation relative to the display device). The stylus may additionally include an internal communications interface configured to transmit the tilt and/or azimuthal angles of the stylus to the touch-sensitive display device. Use of such sensors may provide relatively more accurate tilt and azimuthal angle estimates than the display-focused approaches described above, while reducing the amount of computational work performed by the touch-sensitive display device.

Figure 5:
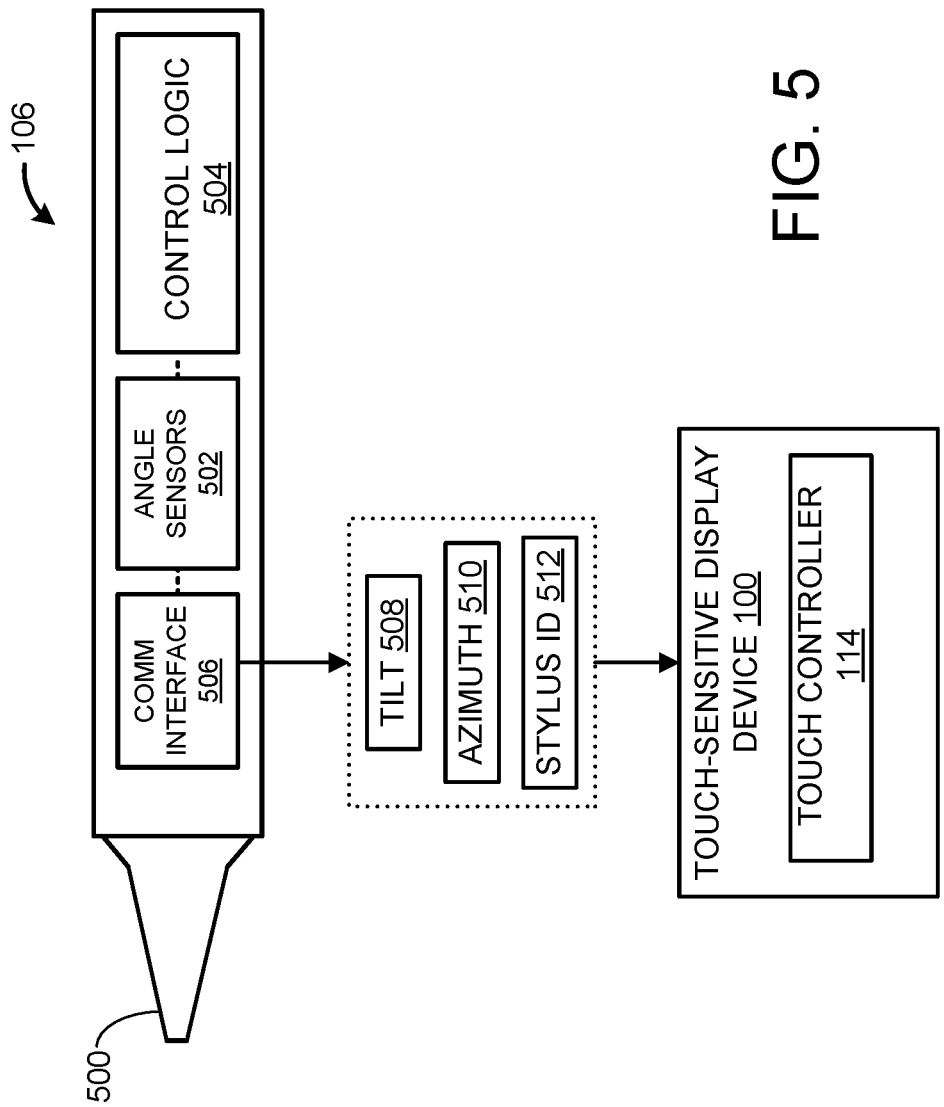
FIG. 5 schematically illustrates receiving an indication of the tilt angle and azimuthal angle of a stylus.

This is schematically illustrated with respect to FIG. 5, which shows example stylus 106 in more detail. As shown, stylus 106 includes a stylus tip 500 configured to contact the surface of the touch-sensitive display and thereby provide input to the touch-sensitive display device. As such, the stylus tip may in some cases be configured to be detectable by the plurality of display electrodes. For example, the stylus tip may be composed of a conductive material that influences electrical conditions at the display electrodes in a predictable manner. Additionally, or alternatively, the stylus tip may include a stylus electrode that may be driven with an electrical signal to influence electrical conditions at one or more of the plurality of display electrodes within the touch-sensitive display.

Stylus 106 also includes one or more angle sensors 502. Sensors 502 may include any collection of sensors suitable for measuring the tilt and/or azimuthal angles of the stylus.

The angle sensors may be controlled by, and/or otherwise communicate with, stylus control logic 504. As with touch controller 114, control logic 504 may be implemented as any suitable computer processing or logic componentry. In one example, control logic 504 may be implemented as logic subsystem 902 described below with respect to FIG. 9. Control logic 504 may be configured to control any or all digital components within stylus 106.

For example, control logic 504 may be configured to control a communications interface 506 of the active stylus. In FIG. 5, communications interface 506 is used to communicatively couple the stylus with touch-sensitive display device 100 and touch controller 114. Using the communications interface, the stylus transmits an indication of its tilt angle 508 and azimuthal angle 510, measured by angle sensors 502, to the touch-sensitive display device. The stylus may additionally transmit a unique stylus identifier 512 corresponding to the stylus. As will be described in more detail below, the unique stylus identifier may in some cases be used to infer an identity of a user of the stylus.

The communications interface of the stylus may use any suitable communications technology. In some examples, the network communications interface may be a suitable data interlink using a wireless communications protocol—e.g., Bluetooth or near-field communication (NFC). Alternatively, the communications interface may be configured to drive one or more stylus electrodes within the stylus using a waveform encoding the tilt and/or azimuthal angles of the stylus. This waveform may be detected by display electrodes and decoded by the touch-sensitive display device.

It will be understood that the tilt and azimuthal angles of the stylus may be calculated by any suitable device, including the touch-sensitive display device (e.g., touch controller 114) and/or stylus. As another example, the stylus may include two or more transmitters configured to emit the same or different signals. The touch-sensitive display device may detect such signals as the stylus approaches the display surface. For example, proximity of the two or more transmitters to the display surface may influence electrical conditions at display electrodes, allowing the signals emitted by the transmitters to be localized to two-dimensional positions on the display surface. The azimuthal angle of the stylus may be inferred from the angle between the localized two-dimensional positions of the transmitter signals. Similarly, the relative strengths and positions of the signals may be used to infer the tilt angle of the stylus. For example, relatively shallow tilt angles (i.e., those nearly parallel to reference line 400 in FIG. 4A) may result in the transmitter signals being localized to relatively similar two-dimensional positions. By contrast, relatively higher tilt angles (i.e., nearly parallel to the plane of the display) may result in the transmitter signals being localized to relatively distant two-dimensional positions.

Returning to FIG. 2, at 206, method 200 includes defining a touch restriction region of the touch-sensitive display based at least on the two-dimensional position of the stylus touch input and the tilt and azimuthal angles of the stylus. This is schematically illustrated with respect to FIG. 6A, which again shows touch-sensitive display 101. In this example, the touch-sensitive display is detecting a first touch input 600 corresponding to a stylus, and a second touch input 602 corresponding to portions of a user hand holding the stylus.

Figure 6A:
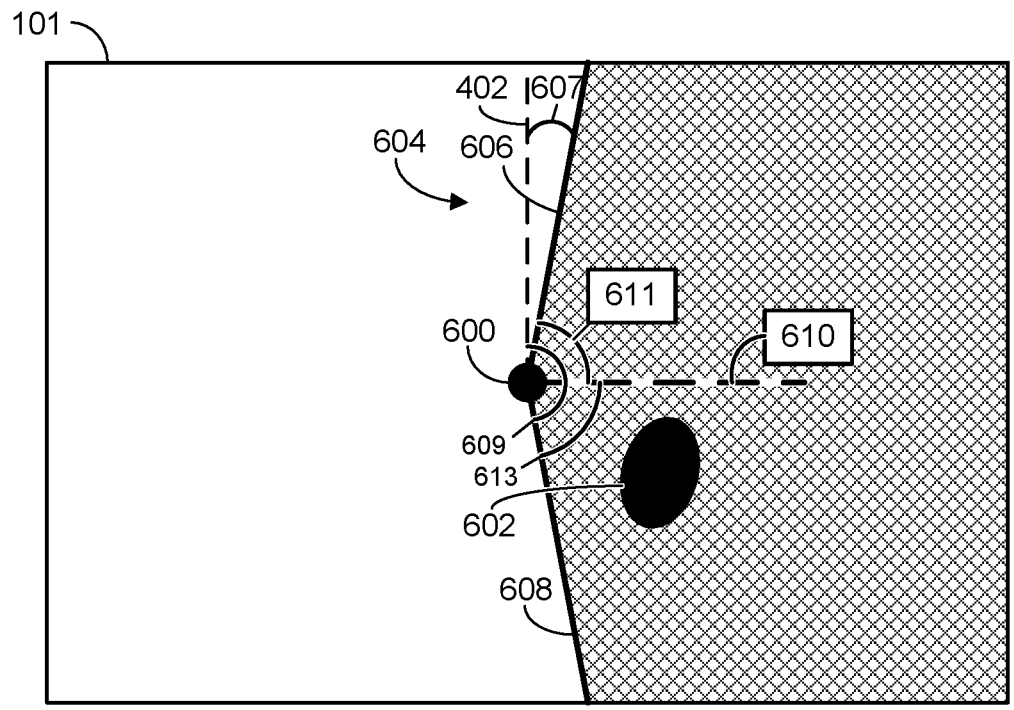
FIGS. 6A and 6B schematically illustrate defining a touch restriction region on a touch-sensitive display.

As discussed above, the user may not intend for the touch-sensitive display device to respond to touch input 602, corresponding to the portion of the user's hand that contacts the display surface as they use the stylus. Accordingly, the touch-sensitive display device defines a touch restriction region 604 proximate to the two-dimensional position of stylus touch input 600, indicated in FIG. 6A by the cross-hatched fill pattern. Touch restriction region 604 includes a first region boundary 606 extending away from the two-dimensional position of the stylus touch input 602 at a first boundary angle 607, as well as a second region boundary 608 extending away from the two-dimensional position of the stylus touch input at a second boundary angle 609. FIG. 6A also includes a projection 610 of the stylus onto the plane of the display. As discussed above, the azimuthal angle of the stylus is given by the relationship between reference line 402 and projection 610. In other words, the angle of projection 610 is the azimuthal angle of the stylus.

For common grips used to hold a stylus while providing touch input to a touch-sensitive display, the user's hand/palm will often contact the surface of the display at a two-dimensional position near the projection of the stylus onto the display. Thus, the first and second boundary angles 607 and 609 are set such that the stylus projects onto the touch restriction region between the first and second region boundaries. Notably, as depicted, touch input 602 corresponding to the user's hand contacting the display surface is within the touch restriction region, meaning it may be processed by the touch-sensitive display device differently from touch inputs outside the touch restriction region, as will be discussed in more detail below. In this manner, by defining the touch restriction region based in part on the azimuthal angle of the stylus, the shape and orientation of the touch restriction region may be advantageously set such that it is relatively likely to include unintended touch inputs corresponding to the user's hand/palm. Thus, the touch-sensitive display device may interpret such inputs differently from intended touch inputs directed to other portions of the touch-sensitive display.

Any suitable values may be used for the first and second boundary angles. Typically, these angles will be set such that the stylus projects onto the touch restriction region, as is shown in FIG. 6A. The touch-sensitive display device may therefore calculate the first and second boundary angles based at least on the azimuthal angle of the stylus. For example, as will be described in more detail below, there may be a first angular difference 611 between the azimuthal angle of the stylus and first boundary angle, and a second angular difference 613 between the azimuthal angle of the stylus and the second boundary angle. In the example of FIG. 6A, the first angular difference is equal to the second angular difference, such that the azimuthal angle of the stylus bisects the touch restriction region. Specifically, in FIG. 6A, each of the first and second angular differences are equal to approximately 80°. Notably, the touch-sensitive display device may consider the absolute values of the first and second angular differences. For example, in a scenario where the azimuthal angle of the stylus is equal to 95° and the second boundary angle is equal to 175°, the second angular difference is 80° rather than −80°.

In other examples, however, the first and second angular differences may have other suitable values, and need not be equal to one another. In general, for common hand grips used for holding a stylus (or other pen-shaped object), the user's hand will tend to contact the display surface at a position that is offset from the stylus's projection onto the plane of the display. Thus, the first and second angular differences may be beneficially set such that any undesirable touch inputs associated with a user's hand contacting the display surface during stylus operation will fall within the touch restriction region, between the first and second region boundaries.

FIG. 6B again schematically depicts touch-sensitive display 101. In this example, however, both the azimuthal angle of the stylus and the first and second region boundaries have changed. In contrast to FIG. 6A, in FIG. 6B the first and second angular differences 611 and 613 are no longer equal. Rather, the first angular difference between first region boundary 606 and the azimuthal angle of the stylus is equal to approximately 20°, while the second angular difference is equal to approximately 70°. Furthermore, the overall angular difference between the first and second boundary angles is equal to approximately 90°, as compared to 160° for FIG. 6A, resulting in an overall smaller touch restriction region.

Figure 6B:
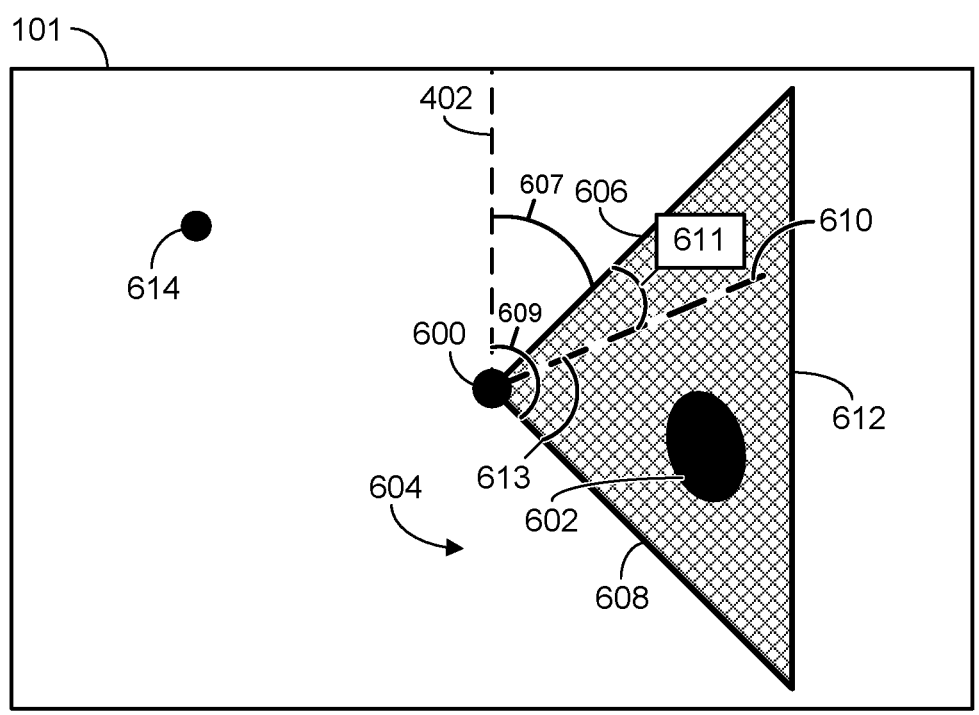

FIG. 6B also depicts another touch input 614 having a position outside the touch restriction region. Touch input 614 may therefore be processed by the touch-sensitive display device differently from touch input 602, as will be discussed in more detail below.

In general, smaller touch restriction regions may be preferable over larger touch restriction regions, provided that the touch restriction region is still sufficiently large to encompass any unintended touch inputs associated with hand/palm contacts during stylus operation. This may reduce the risk that the user (or a different user) provides intended inputs within the touch restriction region that are ignored by the touch-sensitive display device, or otherwise processed in an unsatisfactory way.

In FIG. 6A, each of the first and second region boundaries extend to an edge of the touch-sensitive display. By contrast, in FIG. 6B, the first region boundary and second region boundary have first and second lengths that end before reaching the edge of the touch-sensitive display. In this manner, as discussed above, the overall size of the touch restriction region may be reduced, decreasing the risk that intended user inputs may be ignored by the touch-sensitive display device. Instead, in this example, the first and second region boundaries are connected by a third region boundary 612 extending between the input-distal ends of the first and second region boundaries. The first, second, and third region boundaries therefore define a triangular touch restriction region. In other examples, however, the third region boundary need not be a straight line, as is depicted in FIG. 6B. Instead, the third region boundary could be curved, having either a concave or convex curvature. Furthermore, the touch restriction region need not only be defined by only three boundaries, but instead could have any number of boundaries defining a polygon or irregular shape having any number of straight and/or curved sides.

In cases where the first and/or second region boundaries do not extend to the edge of the touch-sensitive display, the length of each region boundary may be defined in any suitable way. For example, the length of either or both of the first and second region boundaries may be set based at least in part on the tilt angle of the stylus. In general, for relatively smaller tilt angles (e.g., relatively close to perpendicular to the plane of the display surface), the position of the user's hand/palm contact will tend to be close to the two-dimensional position of the stylus touch input. By contrast, for relatively larger tilt angles (e.g., relatively close to parallel to the plane of the display surface), the position of the user's hand/palm contact will tend to be relatively further away from the position of the stylus touch input. The length of either or both of the first and second region boundaries may therefore in some cases be proportional to the stylus tilt angle. In other words, as stylus tilt angle increases, the length of either or both of the first and second region boundaries may increase to define a touch restriction region that extends further away from the position of the stylus touch input.

In this manner, consideration of the tilt angle of the stylus may result in a touch restriction region that is sized such that unintended touch inputs are likely to fall within the restriction region, while intended inputs fall outside the restriction region. This enables the touch-sensitive display device to more easily distinguish and appropriately respond to intended vs unintended touch inputs.

In some cases, the specific shape, size, and/or position of the touch restriction region may be customized or personalized based on information known about the user of the stylus. For example, either or both of the first and second region boundaries may be set based in part on a known handedness of the user. The specific hand used by a user to hold the stylus and provide stylus touch input may influence where the user's hand/palm is likely to contact the surface of the touch-sensitive display. For example, in a scenario where the stylus's azimuthal angle is substantially vertical (i.e., parallel to the Y axis depicted in FIGS. 4A-4C) and the user is right-handed, the user's hand/palm may be expected to contact the surface of the display to the right of the projection of the stylus onto the plane of the display. By contrast, a left-handed user may contact the surface of the display to the left of the stylus projection. Thus, for a right-handed user, the first and second boundary angles may be set such that the touch restriction region is larger to the right-hand side of the stylus projection than the left-hand side.

In general, however, the touch restriction region may be customized or personalized in any suitable way, based on any information known about the user of the stylus. For example, based on user indication or a history of prior use, it may be known that a particular user holds styli using an unconventional grip. This may cause the user's hand/palm to contact the surface of the display at a position that would fall outside the touch restriction regions depicted in FIGS. 6A and/or 6B. Accordingly, the touch-sensitive display device may set alternate, user-specific first and second region boundaries based on each user's specific idiosyncrasies. This may include, for example, setting the first angular difference between the azimuthal angle of the stylus and the first boundary angle, and the second angular difference between the azimuthal angle of the stylus and the second boundary angle, based on a known identity of a user of the stylus.

Information about a user's handedness, preferences, or identity may be stored and retrieved in any suitable way. Such information may be, for example, accessed in a user profile of a user currently logged in, or the user may be prompted to provide pertinent information during use of the touch-sensitive display device. In one example, the identity of the user may be determined based on a unique stylus identifier of the stylus (e.g., unique stylus identifier 512 described above with respect to FIG. 5) associated with the known identity of the user. For example, the touch-sensitive display may maintain a table that associates different unique stylus identifiers with different user identities. Thus, upon receiving a unique stylus identifier for a stylus currently in use, the touch-sensitive display device may infer the identity of the user of the stylus and customize the touch restriction region accordingly.

The present disclosure has primarily assumed that the position of the user's hand/palm contact will fall within the touch restriction region. However, this need not always be the case, particularly in cases of unusual stylus grips as described above. Returning briefly to FIG. 2, at 208, method 200 optionally includes changing either or both of the first and second boundary angles, after detecting a touch input that meets one or more touch restriction criteria and has a two-dimensional position outside the touch restriction region. This may be done such that, after changing the first and/or second boundary angles, the two-dimensional position of the touch input is within the touch restriction region.

Figure 7A:
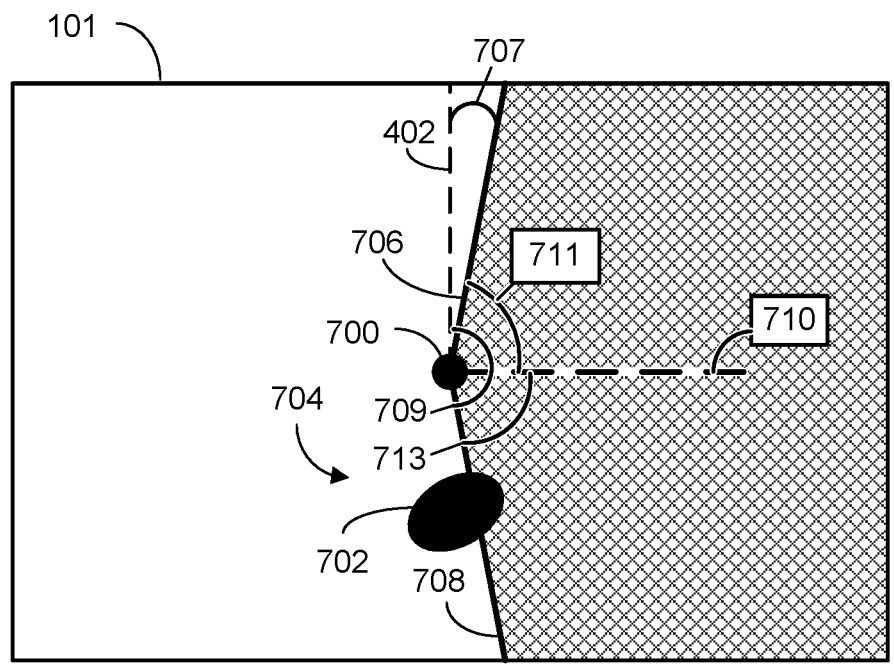
FIGS. 7A and 7B schematically illustrate changing boundary angles of region boundaries of a touch restriction region.
Figure 7B:
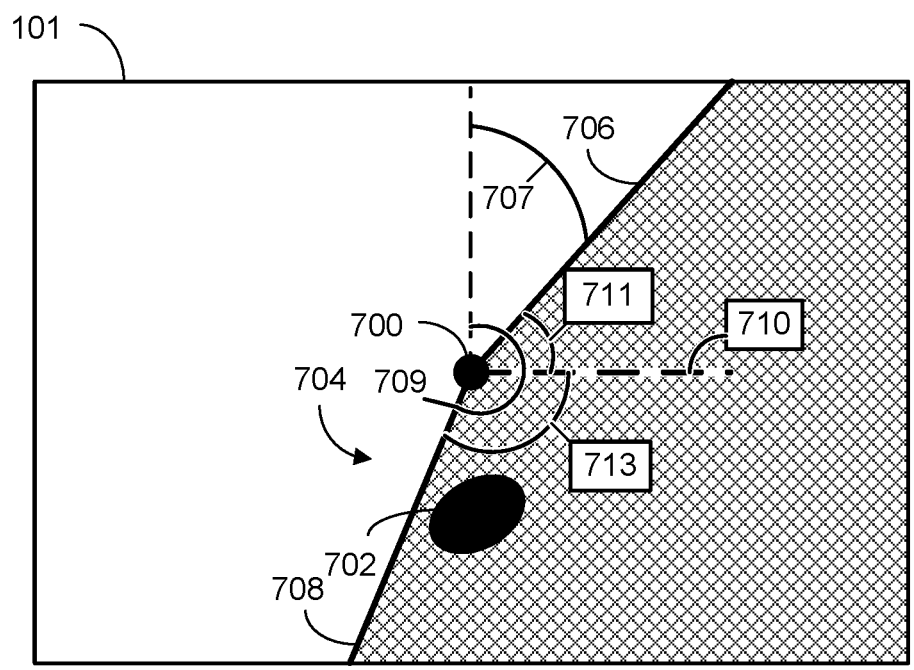

This is schematically illustrated with respect to FIGS. 7A and 7B. FIG. 7A again schematically shows touch-sensitive display 101, receiving a stylus touch input 700. The touch-sensitive display is also receiving a touch input 702 associated with a user's hand/palm contact that falls mostly outside a touch restriction region 704. As with the touch restriction regions described above, region 704 is defined by a first region boundary 706 having a first boundary angle 707, and a second region boundary 708 having a second boundary angle 709, such that the stylus projects onto the touch restriction region as given by projection 710. There is a first angular difference 711 between the first boundary angle and the azimuthal angle of the stylus, and a second angular difference 713 between the second boundary angle and the azimuthal angle of the stylus.

Upon detecting that touch input 702 has a two-dimensional position that is outside touch restriction region 704 and meets one or more touch restriction criteria, the touch-sensitive display device changes both the first and second boundary angles as is shown in FIG. 7B. In this example, both the first and second boundary angles are changed by approximately 30°, such that touch input 702 is now within the touch restriction region. In other examples, however, the first and second boundary angles may be changed by amounts other than 30°. Furthermore, the first and second boundary angles need not both be changed, and in cases where both angles are changed, they need not both be changed by the same amount.

The touch-sensitive display device may use any suitable touch restriction criteria when evaluating whether to move or update the touch restriction region. As one example, the touch-sensitive display device may evaluate whether a particular touch input changes over time. For instance, as a user is providing stylus touch input, the position of their hand/palm contact may remain relatively unchanged even as the stylus touch input changes. Accordingly, one touch restriction criteria may include evaluating whether a particular touch input remains substantially stationary for at least a threshold period of time—e.g., 5 seconds.

As another example, the touch-sensitive display device may evaluate the size and/or shape of the touch input. In general, touch inputs caused by contact of a user's hand or palm with the surface of the display may cause a relatively larger touch "blob" than intended inputs corresponding to other input objects—e.g., styli or fingers. Accordingly, another touch restriction criteria may include a total size and/or shape of a particular touch input. Thus, the touch-sensitive display device may automatically update the touch restriction region to encompass any touch inputs having larger than a threshold size (e.g., 200 pixels).

It will be understood that these touch restriction criteria are non-limiting examples. A touch-sensitive display device may consider any number of additional or alternative touch restriction criteria to those explicitly described herein. Furthermore, these touch restriction criteria are described herein as hard-coded heuristics. Additionally, or alternatively, the touch-sensitive display device may make use of suitable machine learning or artificial intelligence techniques for classifying detected touch inputs as either valid inputs or invalid inputs. For example, the touch-sensitive display device may monitor touch inputs provided to the touch-sensitive display by one or more users over time, and use such information to train a machine learning classifier to recognize invalid touch inputs and update the touch restriction region accordingly. Furthermore, in some examples, different machine learning models may be applied to touch inputs detected inside vs. outside of a touch restriction region. More details regarding suitable machine learning techniques are described below with respect to FIG. 9.

Returning briefly to FIG. 2, at 210, method 200 includes processing touch inputs within the touch restriction region differently than touch inputs outside the touch restriction region. This may be done in various suitable ways. In one example, defining the touch restriction region may include disabling or otherwise ignoring any display electrodes of the touch-sensitive display within the touch restriction region. Thus, processing touch inputs within the touch restriction region differently than touch inputs outside the touch restriction region may include not processing the touch inputs within the touch restriction region at all. Instead, any touch inputs having positions within the touch restriction region may be rejected—i.e., not detected by the touch-sensitive display device.

In other examples, however, the touch-sensitive display device may still receive and interpret input from display electrodes within the touch restriction region. In general, the touch controller may be configured to report detected touch inputs to a touch input evaluator. The touch input evaluator may be, for example, a computer operating system, and/or any other type of software or firmware executable by a computer configured to classify touch inputs reported by a touch controller. The touch input evaluator may then perform some type of action or provide some type of response after receiving touch inputs from the touch controller.

Depending on the implementation, touch inputs detected within the touch restriction region may or may not be reported to the touch input evaluator. In other words, processing the touch inputs within the touch restriction region differently than touch inputs outside the touch restriction region may include only reporting the touch inputs outside the touch restriction region. To reuse the example of FIG. 6B, the touch-sensitive display device may detect touch inputs 600, 602, and 614. Touch inputs 600 and 614, being outside the touch restriction region, may be reported to the touch input evaluator, which may respond to the touch inputs according to its specific programming. By contrast, touch input 602, being within the touch restriction region, may not be reported to the touch input evaluator.

However, this can potentially present a problem in cases where intended user input happens to fall within the touch restriction region. If such intended user inputs are not reported, the touch-sensitive display device will not respond to the intended inputs, which can lead to user frustration.

Alternatively, touch inputs within the touch restriction region may still be reported, but include some type of indication or flag that they are present within the touch restriction region. In other words, processing the touch inputs within the touch restriction region differently than touch inputs outside the touch restriction region may include reporting the touch inputs within the touch restriction region with a flag indicating those reported touch inputs are potentially invalid touch inputs. This can potentially alleviate the problem outlined above. In this scenario, intended inputs that happen to fall within the touch restriction region may still be reported to the touch input evaluator, which may classify them as being either valid or invalid. In this manner, intended inputs that happen to be directed to the touch restriction region may still cause the touch-sensitive display device to respond to the inputs as the user intends.

Figure 8A:
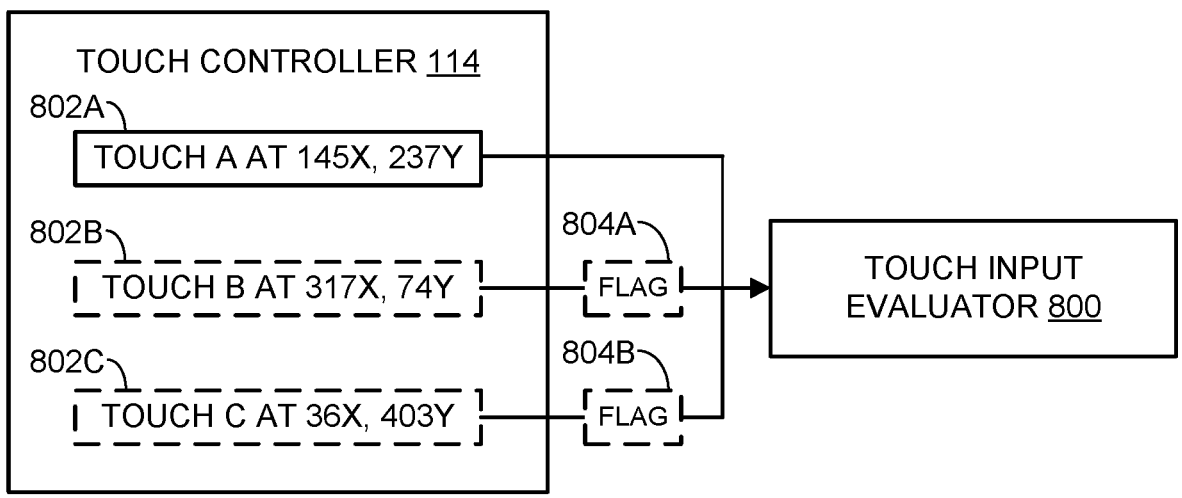
FIGS. 8A and 8B schematically illustrate classification of reported touch inputs.

This is illustrated in FIG. 8A, which schematically represents touch controller 114 reporting various detected touch inputs 802A-C to a touch input evaluator 800. In this example, touch inputs 802A, 802B, and 802C are defined by two-dimensional pixel coordinates. These coordinates may, for example correspond to the center of various detected touch "blobs." In other examples, however, touch inputs may be expressed and reported in other suitable ways. For example, the touch controller may provide a list of all pixels currently detecting touch input, or the touch controller may provide an indication of the boundaries or shapes/sizes of different detected touch blobs. Alternatively, the touch controller may provide the touch input evaluator with a heat map that represents the touch detection status of every pixel in the touch-sensitive display.

In FIG. 8A, touch inputs 802B and 802C are shown with dashed lines to indicate that the two-dimensional positions of the touch inputs are within a touch restriction region. Accordingly, the touch inputs are provided to touch input evaluator 800 with flags 804A and 804B indicating that the touch inputs are potentially invalid. Such flags may take any suitable form. As examples, a flag may be an extra bit included in a representation of the touch input sent to the evaluator, a piece of metadata, a separate file or data structure transmitted in tandem with a list of detected touch inputs, etc.

In some cases, the touch input evaluator may be configured to classify a plurality of touch inputs detected on the touch-sensitive display as being valid or invalid inputs. As discussed above, valid inputs may correspond to intended user inputs—e.g., the user deliberately brings a stylus (or other input object) into proximity with the surface of the touch-sensitive display to interact with or control the device. By contrast, invalid inputs may include any inputs corresponding to unintended contacts with the display surface—e.g., a user's hand/palm contact when providing stylus touch input as discussed above.

Accordingly, in some cases, any flags reported by a touch controller with one or more touch inputs having two-dimensional positions within a touch restriction region may be biasing factors that bias toward classifying the one or more touch inputs as invalid touch inputs. In this manner, not all touch inputs detected within a touch restriction region need be classified as invalid touch inputs. Similarly, not all touch inputs detected outside a touch restriction region need be classified as valid touch inputs. Instead, the touch input evaluator may consider any number of factors (e.g., touch restriction criteria as described above) when classifying touch inputs as being valid or invalid. Presence of a biasing factor, such as flags 804A/804B in FIG. 8A, may be one such factor.

Figure 8B:
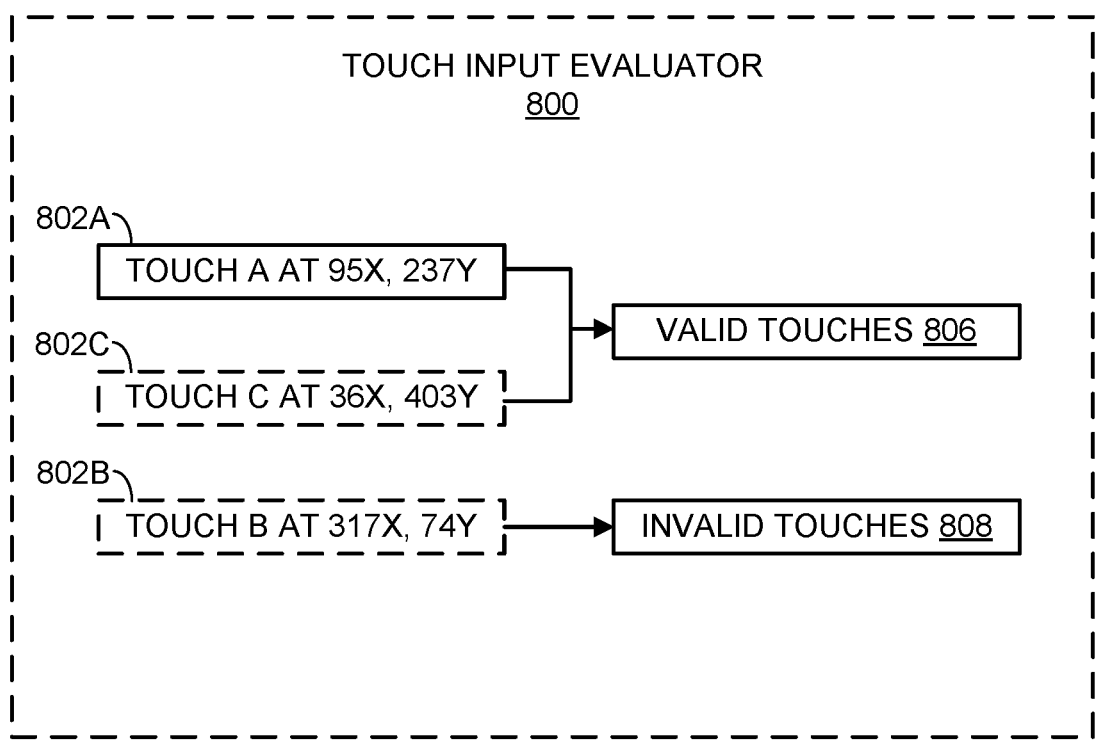

Classification of touch inputs is schematically illustrated with respect to FIG. 8B, which again shows touch input evaluator 800 after it has received touch inputs 802A-C from touch controller 114. As shown, touch inputs 802A and 802C are classified as valid touch inputs 806. By contrast, touch input 802B is classified as an invalid touch input 808. As discussed above, such classification may be done based on consideration of any number of factors, including presence of touch input 802B within a touch restriction region and its accompanying flag 804A. Notably, despite both being located within the touch restriction region, touch input 802B is classified as being invalid while touch input 802C is classified as being valid.

In this example, touch inputs are coarsely classified as being either valid or invalid. In other examples, however, touch inputs may be classified more granularly. For example, touch inputs may be classified as corresponding to different specific input object types. In other words, touch input 802A may be classified as corresponding to a human finger, while touch input 802C is classified as corresponding to an active stylus.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 9:
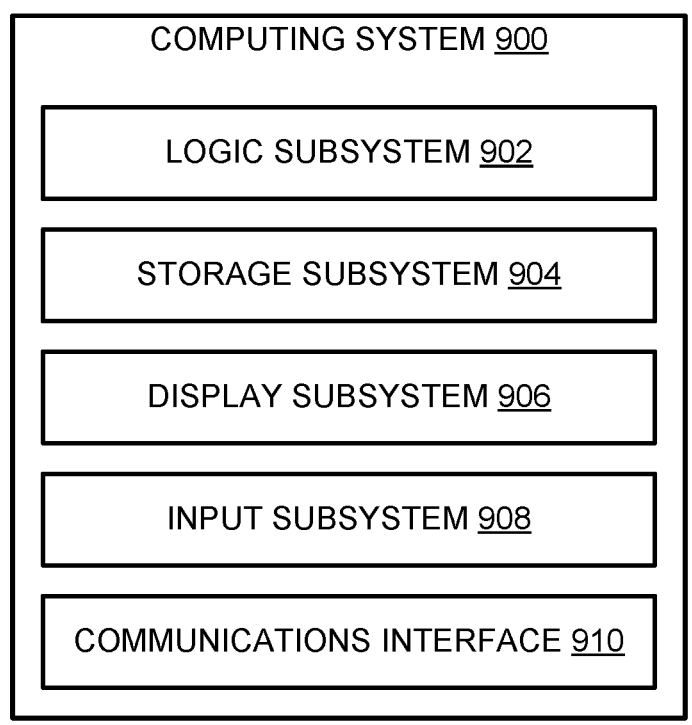
FIG. 9 schematically shows an example computing system.

FIG. 9 schematically shows a simplified representation of a computing system 900 configured to provide any to all of the compute functionality described herein. Computing system 900 may take the form of one or more personal computers, touch-sensitive display devices, tablet computers, home-entertainment computers, gaming devices, mobile computing devices, mobile communication devices (e.g., smart phone), wearable computing devices, Internet of Things (IoT) devices, embedded computing devices, and/or other computing devices.

Computing system 900 includes a logic subsystem 902 and a storage subsystem 904. Computing system 900 may optionally include a display subsystem 906, input subsystem 908, communication subsystem 910, and/or other subsystems not shown in FIG. 9.

Logic subsystem 902 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 904 includes one or more physical devices configured to temporarily and/or permanently hold computer information such as data and instructions executable by the logic subsystem. When the storage subsystem includes two or more devices, the devices may be collocated and/or remotely located. Storage subsystem 904 may include volatile, nonvolatile, dynamic, static, read/write, read-only, random-access, sequential-access, location-addressable, file-addressable, and/or content-addressable devices. Storage subsystem 904 may include removable and/or built-in devices. When the logic subsystem executes instructions, the state of storage subsystem 904 may be transformed—e.g., to hold different data.

Aspects of logic subsystem 902 and storage subsystem 904 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

Machines may be implemented using any suitable combination of state-of-the-art and/or future machine learning (ML), artificial intelligence (AI), and/or natural language processing (NLP) techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

When included, display subsystem 906 may be used to present a visual representation of data held by storage subsystem 904. This visual representation may take the form of a graphical user interface (GUI). Display subsystem 906 may include one or more display devices utilizing virtually any type of technology. In some implementations, display subsystem may include one or more virtual-, augmented-, or mixed reality displays. In some implementations, the display subsystem may be a touch-sensitive display configured to detect touch inputs caused by proximity of input objects to a display surface of the touch-sensitive display.

When included, input subsystem 908 may comprise or interface with one or more input devices. An input device may include a sensor device or a user input device. Examples of user input devices include a keyboard, mouse, touch screen, stylus, or game controller. The input subsystem may in some cases include a plurality of display electrodes configured to detect touch inputs from input objects. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 910 may be configured to communicatively couple computing system 900 with one or more other computing devices. Communication subsystem 910 may include wired and/or wireless communication devices compatible with one or more different communication protocols. The communication subsystem may be configured for communication via personal-, local- and/or wide-area networks.

The methods and processes disclosed herein may be configured to give users and/or any other humans control over any private and/or potentially sensitive data. Whenever data is stored, accessed, and/or processed, the data may be handled in accordance with privacy and/or security standards. When user data is collected, users or other stakeholders may designate how the data is to be used and/or stored. Whenever user data is collected for any purpose, the user data may only be collected with the utmost respect for user privacy (e.g., user data may be collected only when the user owning the data provides affirmative consent, and/or the user owning the data may be notified whenever the user data is collected). If the data is to be released for access by anyone other than the user or used for any decision-making process, the user's consent may be collected before using and/or releasing the data. Users may opt-in and/or opt-out of data collection at any time. After data has been collected, users may issue a command to delete the data, and/or restrict access to the data. All potentially sensitive data optionally may be encrypted and/or, when feasible, anonymized, to further protect user privacy. Users may designate portions of data, metadata, or statistics/results of processing data for release to other parties, e.g., for further processing. Data that is private and/or confidential may be kept completely private, e.g., only decrypted temporarily for processing, or only decrypted for processing on a user device and otherwise stored in encrypted form. Users may hold and control encryption keys for the encrypted data. Alternately or additionally, users may designate a trusted third party to hold and control encryption keys for the encrypted data, e.g., so as to provide access to the data to the user according to a suitable authentication protocol.

When the methods and processes described herein incorporate ML and/or AI components, the ML and/or AI components may make decisions based at least partially on training of the components with regard to training data. Accordingly, the ML and/or AI components may be trained on diverse, representative datasets that include sufficient relevant data for diverse users and/or populations of users. In particular, training data sets may be inclusive with regard to different human individuals and groups, so that as ML and/or AI components are trained, their performance is improved with regard to the user experience of the users and/or populations of users.

ML and/or AI components may additionally be trained to make decisions so as to minimize potential bias towards human individuals and/or groups. For example, when AI systems are used to assess any qualitative and/or quantitative information about human individuals or groups, they may be trained so as to be invariant to differences between the individuals or groups that are not intended to be measured by the qualitative and/or quantitative assessment, e.g., so that any decisions are not influenced in an unintended fashion by differences among individuals and groups.

ML and/or AI components may be designed to provide context as to how they operate, so that implementers of ML and/or AI systems can be accountable for decisions/assessments made by the systems. For example, ML and/or AI systems may be configured for replicable behavior, e.g., when they make pseudo-random decisions, random seeds may be used and recorded to enable replicating the decisions later. As another example, data used for training and/or testing ML and/or AI systems may be curated and maintained to facilitate future investigation of the behavior of the ML and/or AI systems with regard to the data. Furthermore, ML and/or AI systems may be continually monitored to identify potential bias, errors, and/or unintended outcomes.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a touch-sensitive display device comprises: a touch-sensitive display including a plurality of display electrodes configured to detect proximity of input objects to the touch-sensitive display; and a touch controller configured to: determine a two-dimensional position of a stylus touch input based on information from the plurality of display electrodes; receive an indication of a tilt angle and an azimuthal angle of the stylus; define a touch restriction region of the touch-sensitive display based at least on the two-dimensional position of the stylus touch input, and the tilt and azimuthal angles of the stylus, the touch restriction region including a first region boundary extending away from the two-dimensional position of the stylus touch input at a first boundary angle, and a second region boundary extending away from the two-dimensional position of the stylus touch input at a second boundary angle, such that the stylus projects onto the touch restriction region between the first and second region boundaries; and process touch inputs within the touch restriction region differently than touch inputs outside the touch restriction region. In this example or any other example, a first angular difference between the azimuthal angle of the stylus and the first boundary angle is equal to a second angular difference between the azimuthal angle of the stylus and the second boundary angle. In this example or any other example, the first and second angular differences are equal to 80 degrees. In this example or any other example, a first angular difference between the azimuthal angle of the stylus and the first boundary angle, and a second angular difference between the azimuthal angle of the stylus and the second boundary angle, are set based on a known identity of a user of the stylus. In this example or any other example, the known identity of the user of the stylus is determined based on receiving a unique stylus identifier for the stylus, the unique stylus identifier associated with the known identify of the user. In this example or any other example, processing the touch inputs within the touch restriction region differently than the touch inputs outside the touch restriction region includes only reporting the touch inputs outside the touch restriction region. In this example or any other example, processing the touch inputs within the touch restriction region differently than the touch inputs outside the touch restriction region includes reporting the touch inputs within the touch restriction region with a flag indicating potentially invalid touch inputs. In this example or any other example, the flag is useable as a biasing factor for biasing toward classifying the one or more touch inputs within the touch restriction region as invalid inputs. In this example or any other example, the first region boundary and second region boundary each extend to an edge of the touch-sensitive display. In this example or any other example, the first region boundary has a first length, the second region boundary has a second length, and either or both of the first and second lengths are proportional to the tilt angle of the stylus. In this example or any other example, the touch controller is further configured to, after detecting a touch input that meets one or more touch restriction criteria and has a two-dimensional position outside of the touch restriction region, change either or both of the first and second boundary angles such that the two-dimensional position of the touch input is within the touch restriction region. In this example or any other example, the indication of the tilt angle and the azimuthal angle of the stylus is received from the stylus. In this example or any other example, either or both of the first and second boundary angles are set based on a known handedness of the user.

In an example, a method for touch restriction comprises: determining a two-dimensional position of a stylus touch input on a touch-sensitive display based on information received from a plurality of display electrodes of the touch-sensitive display, the plurality of display electrodes configured to detect proximity of input objects to the touch-sensitive display; receiving an indication of a tilt angle and an azimuthal angle of the stylus; defining a touch restriction region of the touch-sensitive display based at least on the two-dimensional position of the stylus touch input and the tilt and azimuthal angles of the stylus, the touch restriction region including a first region boundary extending away from the two-dimensional position of the stylus touch input at a first boundary angle, and a second region boundary extending away from the two-dimensional position of the stylus touch input at a second boundary angle, such that the stylus projects onto the touch restriction region between the first and second region boundaries; and processing touch inputs within the touch restriction region differently than touch inputs outside the touch restriction region. In this example or any other example, a first angular difference between the azimuthal angle of the stylus and the first boundary angle is equal to a second angular difference between the azimuthal angle of the stylus and the second boundary angle. In this example or any other example, a first angular difference between the azimuthal angle of the stylus and the first boundary angle, and a second angular difference between the azimuthal angle of the stylus and the second boundary angle, are set based on a known identity of a user of the stylus. In this example or any other example, processing the touch inputs within the touch restriction region differently than the touch inputs outside the touch restriction region includes only reporting the touch inputs outside the touch restriction region. In this example or any other example, processing the touch inputs within the touch restriction region differently than the touch inputs outside the touch restriction region includes reporting the touch inputs within the touch restriction region with a flag indicating potentially invalid touch inputs. In this example or any other example, the method further comprises, after detecting a touch input that meets one or more touch restriction criteria and has a two-dimensional position outside of the touch restriction region, changing either or both of the first and second boundary angles such that the two-dimensional position of the touch input is within the touch restriction region.

In an example, a touch-sensitive display device comprises: a touch-sensitive display including a plurality of display electrodes configured to detect proximity of input objects to the touch-sensitive display; and a touch controller configured to: determine a two-dimensional position of an active stylus touch input based on information from the plurality of display electrodes; receive, from the active stylus, an indication of a tilt angle and an azimuthal angle of the active stylus; define a touch restriction region of the touch-sensitive display based at least on the two-dimensional position of the active stylus touch input, and the tilt and azimuthal angles of the active stylus, the touch restriction region including a first region boundary extending away from the two-dimensional position of the active stylus touch input at a first boundary angle, and a second region boundary extending away from the two-dimensional position of the active stylus touch input at a second boundary angle, such that the active stylus projects onto the touch restriction region between the first and second region boundaries; and process touch inputs within the touch restriction region differently than touch inputs outside the touch restriction region.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A touch-sensitive display device, comprising:
   a touch-sensitive display including a plurality of display electrodes configured to detect proximity of input objects to the touch-sensitive display; and
   a touch controller configured to:
      determine a two-dimensional position of a stylus touch input based on information from the plurality of display electrodes;
      receive an indication of a tilt angle and an azimuthal angle of the stylus;
      define a touch restriction region of the touch-sensitive display based at least on the two-dimensional position of the stylus touch input, and the tilt and azimuthal angles of the stylus, the touch restriction region including a first region boundary extending away from the two-dimensional position of the stylus touch input at a first boundary angle, and a second region boundary extending away from the two-dimensional position of the stylus touch input at a second boundary angle, such that the stylus projects onto the touch restriction region between the first and second region boundaries; and
      process touch inputs within the touch restriction region differently than touch inputs outside the touch restriction region.

2. The touch-sensitive display device of claim 1, where a first angular difference between the azimuthal angle of the stylus and the first boundary angle is equal to a second angular difference between the azimuthal angle of the stylus and the second boundary angle.

3. The touch-sensitive display device of claim 2, where the first and second angular differences are equal to 80 degrees.

4. The touch-sensitive display device of claim 1, where a first angular difference between the azimuthal angle of the stylus and the first boundary angle, and a second angular difference between the azimuthal angle of the stylus and the second boundary angle, are set based on a known identity of a user of the stylus.

5. The touch-sensitive display device of claim 4, where the known identity of the user of the stylus is determined based on receiving a unique stylus identifier for the stylus, the unique stylus identifier associated with the known identify of the user.

6. The touch-sensitive display device of claim 1, where processing the touch inputs within the touch restriction region differently than the touch inputs outside the touch restriction region includes only reporting the touch inputs outside the touch restriction region.

7. The touch-sensitive display device of claim 1, where processing the touch inputs within the touch restriction region differently than the touch inputs outside the touch restriction region includes reporting the touch inputs within the touch restriction region with a flag indicating potentially invalid touch inputs.

8. The touch-sensitive display device of claim 7, where the flag is useable as a biasing factor for biasing toward classifying the one or more touch inputs within the touch restriction region as invalid inputs.

9. The touch-sensitive display device of claim 1, where the first region boundary and second region boundary each extend to an edge of the touch-sensitive display.

10. The touch-sensitive display device of claim 1, where the first region boundary has a first length, the second region boundary has a second length, and either or both of the first and second lengths are proportional to the tilt angle of the stylus.

11. The touch-sensitive display device of claim 1, where the touch controller is further configured to, after detecting a touch input that meets one or more touch restriction criteria and has a two-dimensional position outside of the touch restriction region, change either or both of the first and second boundary angles such that the two-dimensional position of the touch input is within the touch restriction region.

12. The touch-sensitive display device of claim 1, where the indication of the tilt angle and the azimuthal angle of the stylus is received from the stylus.

13. The touch-sensitive display device of claim 1, where either or both of the first and second boundary angles are set based on a known handedness of the user.

14. A method for touch restriction, comprising:
   determining a two-dimensional position of a stylus touch input on a touch-sensitive display based on information received from a plurality of display electrodes of the touch-sensitive display, the plurality of display electrodes configured to detect proximity of input objects to the touch-sensitive display;
   receiving an indication of a tilt angle and an azimuthal angle of the stylus;
   defining a touch restriction region of the touch-sensitive display based at least on the two-dimensional position of the stylus touch input and the tilt and azimuthal angles of the stylus, the touch restriction region including a first region boundary extending away from the two-dimensional position of the stylus touch input at a first boundary angle, and a second region boundary extending away from the two-dimensional position of the stylus touch input at a second boundary angle, such that the stylus projects onto the touch restriction region between the first and second region boundaries; and
   processing touch inputs within the touch restriction region differently than touch inputs outside the touch restriction region.

15. The method of claim 14, where a first angular difference between the azimuthal angle of the stylus and the first boundary angle is equal to a second angular difference between the azimuthal angle of the stylus and the second boundary angle.

16. The method of claim 14, where a first angular difference between the azimuthal angle of the stylus and the first boundary angle, and a second angular difference between the azimuthal angle of the stylus and the second boundary angle, are set based on a known identity of a user of the stylus.

17. The method of claim 14, where processing the touch inputs within the touch restriction region differently than the touch inputs outside the touch restriction region includes only reporting the touch inputs outside the touch restriction region.

18. The method of claim 14, where processing the touch inputs within the touch restriction region differently than the touch inputs outside the touch restriction region includes reporting the touch inputs within the touch restriction region with a flag indicating potentially invalid touch inputs.

19. The method of claim 14, further comprising, after detecting a touch input that meets one or more touch restriction criteria and has a two-dimensional position outside of the touch restriction region, changing either or both of the first and second boundary angles such that the two-dimensional position of the touch input is within the touch restriction region.

20. A touch-sensitive display device, comprising:
- a touch-sensitive display including a plurality of display electrodes configured to detect proximity of input objects to the touch-sensitive display; and
- a touch controller configured to:
  - determine a two-dimensional position of an active stylus touch input based on information from the plurality of display electrodes;
  - receive, from the active stylus, an indication of a tilt angle and an azimuthal angle of the active stylus;
  - define a touch restriction region of the touch-sensitive display based at least on the two-dimensional position of the active stylus touch input, and the tilt and azimuthal angles of the active stylus, the touch restriction region including a first region boundary extending away from the two-dimensional position of the active stylus touch input at a first boundary angle, and a second region boundary extending away from the two-dimensional position of the active stylus touch input at a second boundary angle, such that the active stylus projects onto the touch restriction region between the first and second region boundaries; and
  - process touch inputs within the touch restriction region differently than touch inputs outside the touch restriction region.

\* \* \* \* \*